United States Patent
Daus et al.

(10) Patent No.: US 8,770,255 B2
(45) Date of Patent: *Jul. 8, 2014

(54) DOOR RELEASE MECHANISIM

(75) Inventors: Mark Daus, Doylestown, OH (US); Alvin Eiterman, Hilliard, OH (US)

(73) Assignee: Overhead Door Corporation, Lewisville, TX (US)

( * ) Notice: Subject to any disclaimer, the term of this patent is extended or adjusted under 35 U.S.C. 154(b) by 58 days.

This patent is subject to a terminal disclaimer.

(21) Appl. No.: 12/987,684

(22) Filed: Jan. 10, 2011

(65) Prior Publication Data

US 2011/0099914 A1  May 5, 2011

Related U.S. Application Data

(62) Division of application No. 11/976,363, filed on Oct. 24, 2007, now Pat. No. 7,878,230.

(51) Int. Cl.
*E05F 15/20* (2006.01)

(52) U.S. Cl.
USPC ............... 160/9; 160/1; 478/254; 478/310

(58) Field of Classification Search
USPC .................. 160/1, 7, 9, 321; 475/254, 310
See application file for complete search history.

(56) References Cited

U.S. PATENT DOCUMENTS

| | | | |
|---|---|---|---|
| 1,270,964 A | 7/1918 | McCloud |
| 1,617,439 A | 2/1927 | Duncanson |
| 1,718,752 A | 6/1929 | McCloud |
| 2,019,085 A | 10/1935 | Miller |
| 2,374,829 A | 5/1945 | Nardone |
| 2,528,869 A | 11/1950 | De Laney |
| 2,564,208 A | 8/1951 | Michelman |
| 2,946,377 A | 7/1960 | Zoll et al. |
| 3,420,121 A | 1/1969 | Stieg |
| 3,685,567 A | 8/1972 | Pemberton et al. |
| 3,752,208 A | 8/1973 | Roberts |
| 4,147,197 A | 4/1979 | Bailey et al. |
| 4,664,170 A | 5/1987 | Labelle |

(Continued)

OTHER PUBLICATIONS

Written Opinion issued on Apr. 27, 2010 in corresponding PCT Application No. PCT/US2008/080683.

(Continued)

*Primary Examiner* — Blair M. Johnson
(74) *Attorney, Agent, or Firm* — Gardere Wynne Sewell LLP

(57) ABSTRACT

A door hoist includes a bracket, drive sprocket, ring gear, hub assembly, set of planetary gears, and governor shaft. The drive sprocket has a drive sprocket axis. The ring gear is fastened to the drive sprocket. The ring gear has a ring gear axis that is in alignment with the drive sprocket axis. The hub assembly includes a connector to receive a door drive shaft and secure the door drive shaft in a fixed rotational alignment with the hub assembly. The set of planetary gears is rotationally mounted to the hub assembly. The set of planetary gears is configured to mate with the ring gear. The governor shaft includes a sun gear, brake assembly, and link. The sun gear is configured to mate with the set of planetary gears. The brake assembly has an engaged position and a disengaged position. The sun gear is rotationally fixed relative to the bracket in response to the brake assembly being in the engaged position. In response to the brake assembly being in the disengaged position, rotation of the sun gear is unfixed relative to the bracket. The link secures the brake assembly in the engaged position. The link is configured to melt in response to an ambient temperature exceeding a predetermined temperature.

7 Claims, 6 Drawing Sheets

(56) References Cited

U.S. PATENT DOCUMENTS

| | | | |
|---|---|---|---|
| 5,022,452 A | 6/1991 | Burrell |
| 5,123,134 A | 6/1992 | Alberto et al. |
| 5,203,392 A | 4/1993 | Shea |
| 5,245,879 A | 9/1993 | McKeon |
| 5,253,693 A | 10/1993 | Marlatt et al. |
| 5,261,186 A | 11/1993 | Saino |
| 5,263,527 A | 11/1993 | Marlatt et al. |
| 5,353,859 A | 10/1994 | Oltahfer et al. |
| 5,355,927 A | 10/1994 | McKeon |
| 5,482,103 A | 1/1996 | Burgess et al. |
| 5,542,460 A | 8/1996 | McKeon |
| 5,576,581 A | 11/1996 | Iannuzzi et al. |
| 5,613,321 A | 3/1997 | Rizkovsky |
| 5,839,766 A | 11/1998 | Iannuzzi et al. |
| 5,893,234 A | 4/1999 | McKeon |
| 5,896,907 A | 4/1999 | Dever et al. |
| 5,931,212 A | 8/1999 | Mullet et al. |
| 6,014,307 A | 1/2000 | Crimmins |
| 6,055,885 A | 5/2000 | Shea |
| 6,123,134 A | 9/2000 | Thomas et al. |
| 6,155,234 A | 12/2000 | Hartke et al. |
| 6,155,324 A | 12/2000 | Elliott et al. |
| 6,196,943 B1 | 3/2001 | Chen |
| 6,338,412 B1 | 1/2002 | Serres et al. |
| 6,388,412 B1 | 5/2002 | Reed et al. |
| 6,401,792 B1 | 6/2002 | Mullet et al. |
| 6,422,965 B1 | 7/2002 | Balli et al. |
| 6,484,784 B1 | 11/2002 | Weik, III et al. |
| 6,530,863 B2 | 3/2003 | Balli et al. |
| 6,712,116 B2 | 3/2004 | Beaudoin et al. |
| 6,737,823 B2 | 5/2004 | Reed et al. |
| 6,890,279 B2 | 5/2005 | Ryberg |
| 6,959,751 B2 | 11/2005 | Savard et al. |
| 6,986,378 B2 | 1/2006 | Beaudoin et al. |
| 7,055,283 B2 | 6/2006 | Hsieh |
| 7,086,441 B2 | 8/2006 | Barriault et al. |
| 8,162,026 B1 | 4/2012 | Lundahl |
| 2002/0111242 A1 | 8/2002 | Balli et al. |
| 2009/0108245 A1 | 4/2009 | Daus et al. |

OTHER PUBLICATIONS

International Search Report and Written Opinion issued on Dec. 18, 2008.
Protest filed with the US Patent & Trademark Office on Aug. 6, 2009.

DOOR RELEASE MECHANISIM

FIELD OF THE INVENTION

The present invention generally relates to a door hoist. More particularly, the present invention pertains to a device and system for automatically releasing a door in response to an event.

BACKGROUND OF THE INVENTION

Conventionally, door hoist systems are utilized to operate a variety of doors. Particular examples of doors operated via a door hoist include rolling type, sectional, and the like. These types of doors are typically utilized for controlling access to garages, ware houses, etc. In the event of a fire, it is generally beneficial to close these doors to limit the amount of oxygen supplied to the fire and slow the spread of fire from one side of the door to the other.

Conventional electronic fire door systems are generally electronically or computer operated. Such systems are costly to design, install, and maintain. In addition, conventional electronic fire door systems are generally significantly larger than a standard door hoist. As such, retrofitting electronic fire door systems into an existing building may require structural alteration of the building. As a result, the installation and maintenance of electronic fire door systems may be cost prohibitive in some instances.

Accordingly, it is desirable to provide a method and apparatus capable of overcoming the disadvantages described herein at least to some extent.

SUMMARY OF THE INVENTION

The foregoing disadvantages are overcome, at least to a great extent, by the present invention, wherein in one respect, a device and system is provided that in some embodiments automatically releases a door in response to an event.

An embodiment of the present invention pertains to a door hoist to operate a door. The door hoist includes a bracket, drive sprocket, ring gear, hub assembly, set of planetary gears, and governor shaft. The drive sprocket has a drive sprocket axis and is fastened to a ring gear. The ring gear has a ring gear axis that is in alignment with the drive sprocket axis. The hub assembly includes a connector to receive a door drive shaft and secure the door drive shaft in a fixed rotational alignment with the hub assembly. The set of planetary gears is rotationally mounted to the hub assembly. The set of planetary gears is configured to mate with the ring gear. The governor shaft includes a sun gear, brake assembly, and link. The sun gear is configured to mate with the set of planetary gears. The brake assembly has an engaged position and a disengaged position. The sun gear is rotationally fixed relative to the bracket in response to the brake assembly being in the engaged position. In response to the brake assembly being in the disengaged position, rotation of the sun gear is unfixed relative to the bracket. The link secures the brake assembly in the engaged position.

Another embodiment of the present invention relates to a fire door hoist system to operate a door and automatically close the door in response to a fire. The fire door hoist system includes a door hoist and door release assembly. The door hoist operates the door. The door hoist includes a bracket, drive sprocket, ring gear, hub assembly, set of planetary gears, and sun gear. The drive sprocket has a drive sprocket axis and is fastened to a ring gear. The ring gear has a ring gear axis that is in alignment with the drive sprocket axis. The hub assembly includes a connector to receive a door drive shaft and secure the door drive shaft in a fixed rotational alignment with the hub assembly. The set of planetary gears is rotationally mounted to the hub assembly. The set of planetary gears is configured to mate with the ring gear. The sun gear is configured to mate with the set of planetary gears. The door release assembly automatically releases the door in response to the fire. The door release assembly includes a governor shaft, brake assembly, and link. The governor shaft is secured to the sun gear. The brake assembly has an engaged position and a disengaged position. The governor shaft is rotationally fixed relative to the bracket in response to the brake assembly being in the engaged position. In response to the brake assembly being in the disengaged position, the rotation of the governor shaft is unfixed relative to the bracket. The link secures the brake assembly in the engaged position.

Yet another embodiment of the present invention pertains to a door hoist to operate a door. The door hoist includes a bracket, drive sprocket, set of planetary gears, hub assembly, ring gear, and governor shaft. The drive sprocket has a drive sprocket axis and is rotationally fastened to the set of planetary gears. The set of planetary gears has an axis that is in alignment with the drive sprocket axis. The hub assembly includes a connector to receive a door drive shaft and secure the door drive shaft in a fixed rotational alignment with the hub assembly. The ring gear is fastened to the hub assembly. The ring gear is configured to mate with the set of planetary gears. The governor shaft includes a sun gear, brake assembly, and link. The sun gear is configured to mate with the set of planetary gears. The brake assembly has an engaged position and a disengaged position. The sun gear is rotationally fixed relative to the bracket in response to the brake assembly being in the engaged position. In response to the brake assembly being in the disengaged position, rotation of the sun gear is unfixed relative to the bracket. The link secures the brake assembly in the engaged position.

There has thus been outlined, rather broadly, certain embodiments of the invention in order that the detailed description thereof herein may be better understood, and in order that the present contribution to the art may be better appreciated. There are, of course, additional embodiments of the invention that will be described below and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of embodiments in addition to those described and of being practiced and carried out in various ways. Also, it is to be understood that the phraseology and terminology employed herein, as well as the abstract, are for the purpose of description and should not be regarded as limiting.

As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

DETAILED DESCRIPTION OF THE PREFERRED EMBODIMENT

In various embodiments of the invention a simplified device and system are provided to automatically release a door in response to an event. In a particular example, the device is configured to close a door in the event of a fire. For example, when attached to a door that is biased to close, a release assembly connecting a hoist assembly to the door assembly may be configured to release the door assembly from the hoist assembly in response to a fire or smoke. Released from the hoist assembly, the door may be allowed to close. In another example, the release assembly may be configured to release the door assembly from the hoist assembly in response to a security incident. In yet another example, the release assembly connects the hoist assembly to a door assembly that is biased to open. In this example, the release may be controlled to release the door assembly from the hoist assembly to facilitate egress through the door. In comparison to electronically controlled or computer controlled door closing systems, this simplified device is easier, less expensive, and less time consuming to manufacture. For the consumer, this simplified device is easier and less expensive to install and maintain in comparison to electronically controlled door closing systems.

Figure 1:
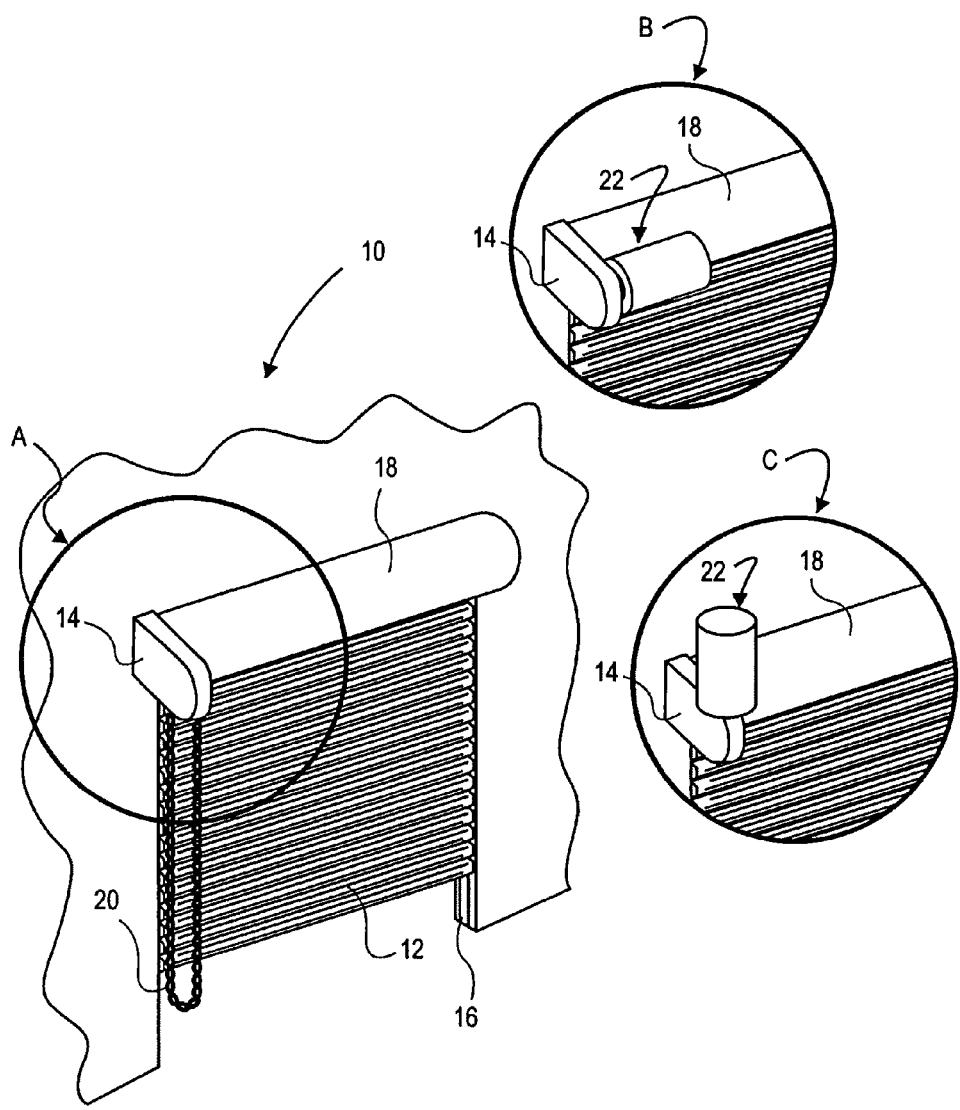
FIG. 1 is a perspective view of a door system according to an embodiment of the invention.

An embodiment of the invention will now be described with reference to the drawing figures, in which like reference numerals refer to like parts throughout. As shown in FIG. 1, a door system 10 includes a door 12 and a hoist 14. The door 12 may include any suitable door or other such covering structure operable to cover an opening. In general, the door 12 may include rollup, swing, sliding, etc. type doors. In a particular example, the door 12 is a conventional rollup type door configured to slide within a track 16 and roll up into a cover 18. Such rollup type doors are well known to include a cylinder or shaft within the cover 18 to operate the door 12. That is, the door 12 is drawn into the cover 18 by rotating the shaft and rolling the door about the shaft or a cylinder connected to the shaft. The door 12 is controlled or allowed to close by rotating the shaft in the opposite direction and/or allowing gravity to draw the door 12 downwards. In this regard, the door 12 is biased in the closed position. A door that is otherwise suitable for use with various embodiments of the invention but is not biased in the closed position may be modified to be biased in the closed position. For example, a spring or weight or other such door closing device may be added to the door.

Figure 2:
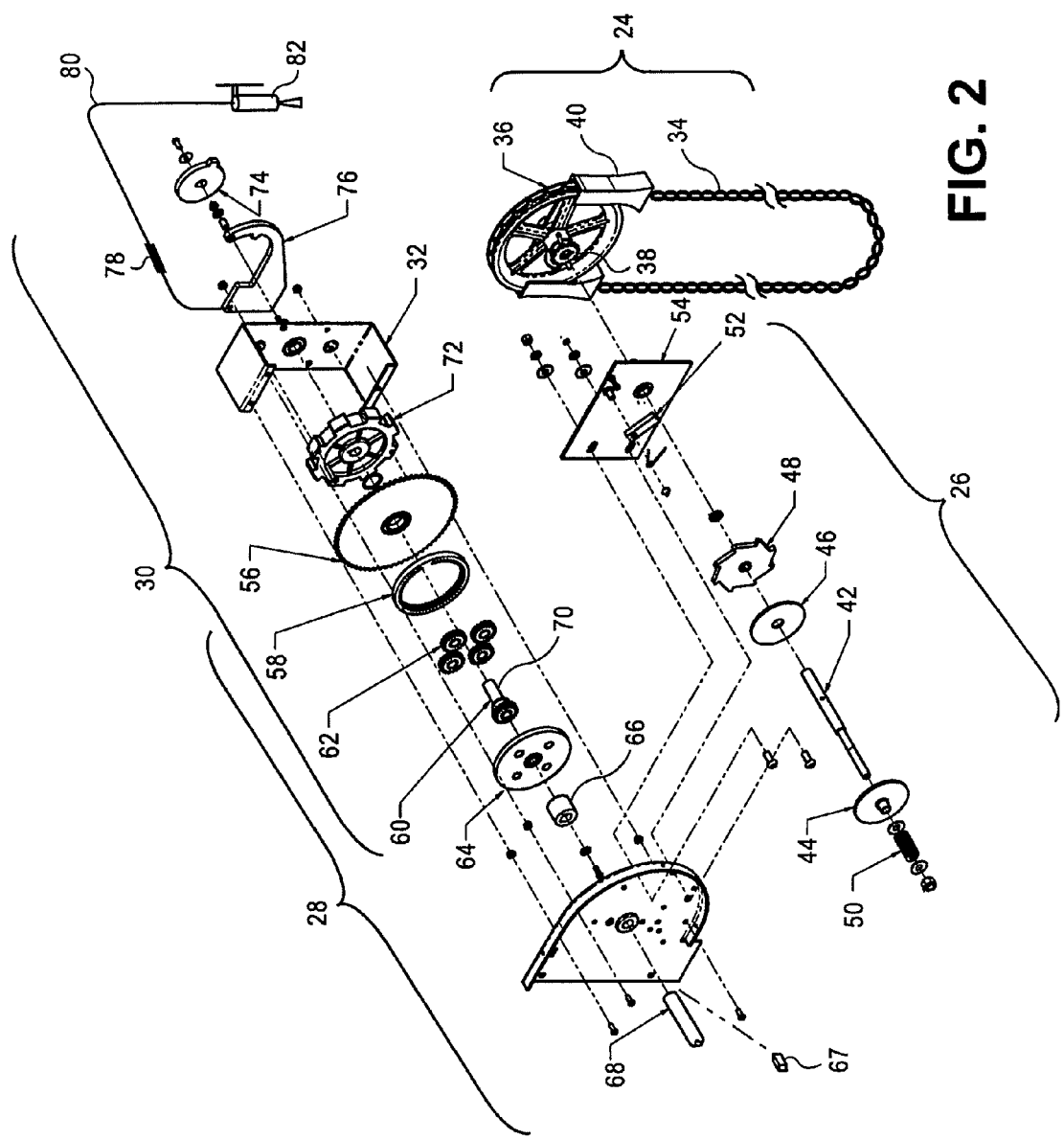
FIG. 2 is an exploded view of the hoist according to an embodiment of the invention.

The hoist 14 according to various embodiments may be operated via any suitable mechanism. In several particular examples shown in insets A, B, and C, the hoist 14 may include a chain drive 20 or motor 22 and the motor 22 may be mounted vertically or horizontally. A particular example of the chain drive 20 is shown in FIG. 2. Particular examples of vertically and horizontally mounted motors 22 are shown respectively shown in FIGS. 5 and 6.

FIG. 2 is an exploded view of the hoist 14 according to an embodiment of the invention. As shown in FIG. 2, the hoist 14 includes a chain hoist wheel assembly 24, unidirectional brake assembly 26, drive assembly 28, door release assembly 30, and bracket 32. The chain hoist wheel assembly 24 is optional and in this or other embodiments, any suitable actuator may be substituted. For example, the motor 22 may replace the chain hoist assembly 28. If present, the chain hoist assembly 24 includes a chain 34, chain hoist wheel 36, chain drive sprocket 38, chain guards 40, and chain hoist shaft 42. To operate the door 12, the chain 34 may be pulled by a user to urge the chain hoist wheel 36 to rotate. The chain drive sprocket 38 is integral to or fastened to the chain hoist wheel 36. As a result, rotation of the chain hoist wheel 36 induces a corresponding rotation of the chain drive sprocket 38. In turn, operation of the chain hoist wheel assembly 24 urges the drive assembly 28 to raise or lower the door 12. As is generally known, inducing a rotation of the drive assembly 28 in a first direction causes the door 12 to raise and inducing an opposite rotation causes the door 12 to lower.

The unidirectional brake assembly 26 is optionally included to accompany actuating assemblies that lack sufficient self-braking characteristics. If present, the unidirectional brake assembly 26 includes a brake pressure plate 44, brake pad 46, ratcheted pressure plate 48, spring 50, pawl 52, and mounting plate 54. The brake pressure plate 44, brake pad 46, ratcheted pressure plate 48, and spring 50 are mounted to the chain hoist shaft 42. The brake pressure plate 44 is pinned or otherwise fixed to rotate with the chain hoist shaft 42. The pawl 52 is mounted to the mounting plate 54 or the bracket 32. The ratcheted pressure plate 48 includes one or more detents or teeth to engage the pawl 52. In this manner, the ratcheted pressure plate 48 is configured to rotate in a first direction and the ratcheted pressure plate 48 is stopped from rotating in a reverse rotational direction by the interaction of the pawl 52 and teeth.

The chain hoist wheel assembly 24 shown in FIG. 2 may provide so little rotational resistance that, barring additional intervention, the door 12 may tend to fall closed. To reduce this tendency, the unidirectional brake assembly 26 is configured to provide resistance to rotation which results in a downward movement of the door 12. To ease the operation of raising the door 12, the unidirectional brake assembly 26 rotates substantially freely in the direction of rotation that raises the door 12.

In other instances, the chain hoist wheel assembly 24, motor 22, or other such actuator may provide sufficient rotational resistance to retain the door 12 in an open position. For example, a worm gear (shown in FIG. 6) may be employed to urge the drive assembly 28 to rotate. The direction of torque transmission (input shaft vs. output shaft) is not reversible in conventional worm gear trains. In this or other such instances, the unidirectional brake assembly 26 may be omitted.

The drive assembly 28 according to various embodiments provides a simplified gear train in comparison to conventional door hoists. This simplified gear train reduces the material and labor costs, reduces the size of the hoist 14, and may increase reliability. It is a further advantage of the drive assembly 28 that the door release assembly 30 is fully integrated into this simplified gear train and shares components therewith. This further simplifies the door system, which results in a further reduction of material and labor costs.

As shown in FIG. 2, the drive assembly 28 includes a drive sprocket 56, annulus or ring gear 58, sun gear 60, set of planetary gears 62, hub assembly 64, and connector 66. The drive sprocket 56 is arranged or configured to mate with the chain drive sprocket 38 or similar such gear of the motor 22 or other such actuator. In an embodiment, the ring gear 58 is integral to or fixed to the drive sprocket 56. In a particular example, the ring gear 58 is welded to the drive sprocket 56 with a central or rotational axis of the ring gear 58 coinciding with a central axis of the drive sprocket 56. The sun gear 60 is disposed to coincide with the central axis of the ring gear 58. The set of planetary gears 62 is disposed between the ring gear 58 and the sun gear 60 and configured to mate with both. While the number of individual planetary gears in the set of planetary gears 62 may vary, such gear trains typically include at least a pair, and more typically four, individual planetary gears to balance and distribute loads throughout the gear train. The hub assembly 64 may serve as a planet carrier for the set of planet gears 62. In this capacity, the ring gear 58 functions as the input shaft, the rotation of which causes the set of planet gears 62 to rotate about a fixed sun gear 60 and the hub assembly 64 is the output shaft to operate the door 12. In this regard, the connector 66 is fixed to the hub assembly 64. The connector 66 is configured to receive and rotationally secure a door shaft 68. The door shaft 68 operates the door 12 and may be secured to the connector 66 in any suitable manner. In a particular example, the door shaft 68 includes a channel for a spline 67, the connector 66 includes a channel for the spline 67, and the door shaft 68 and connector 66 are locked in rotational alignment by the insertion of the spline 67 into the channel. In other examples, the door shaft 68 and connector 66 may include mating "D" or square configurations, and/or may be welded, press fit, or otherwise fastened together.

In another embodiment, the ring gear 58 is integral to or fixed to the hub assembly 64 and the set of planetary gears 62 are rotationally mounted to the sprocket 56. That is, the sprocket 56 may serve as a planet carrier for the set of planet gears 62. In addition, other arrangements of the gear train are within the scope of the invention.

The door release assembly 30 includes a governor shaft 70, governor 72, plate 74, drop arm 76, and link 78. The governor shaft 70 is secured to the sun gear 60. In various examples, the sun gear 60 may be press fit, pinned, splined, or otherwise fixed to the governor shaft 70. The governor 72 includes any suitable governing device such as, for example, a viscous governor, mechanical, brake-type governor, and the like. The governor 72 includes a hub that is fixed to the governor shaft 70. The plate 74 is secured to the governor shaft 70. In various examples, the plate 74 may be press fit, pinned, splined, or otherwise fixed to the governor shaft 70. The plate 74 includes at least one point or tooth configured to engage a corresponding point, indent, or tooth on the drop arm 76. The drop arm 76 includes two ends. A first end is pivotally fixed with respect to the plate 74. The second end is secured via the link 78. In this secured position, the drop arm 76 and the plate 74 are configured to preclude rotation of the governor shaft 70. In response to removal of the link 78 or loss of structural integrity of the link 78, the drop arm 76 is allowed to swing or pivot about the first end and disengage from the plate 74. In this disengaged position, the plate 74 and therefore the governor shaft 70 are free to rotate.

Figure 4:
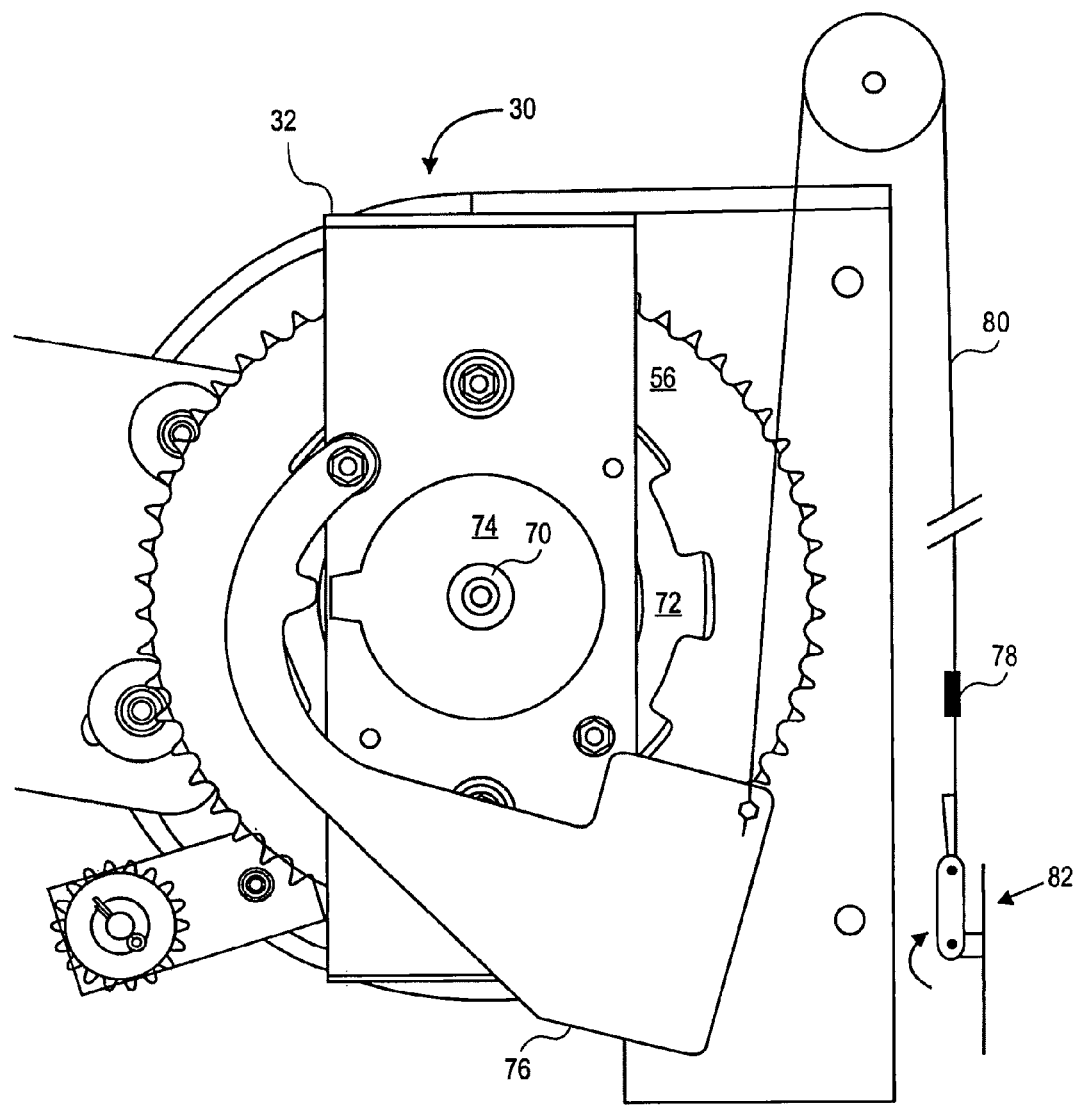
FIG. 4 is a simplified view of the release assembly in a disengaged position according to the embodiment of FIG. 3.
Figure 5:
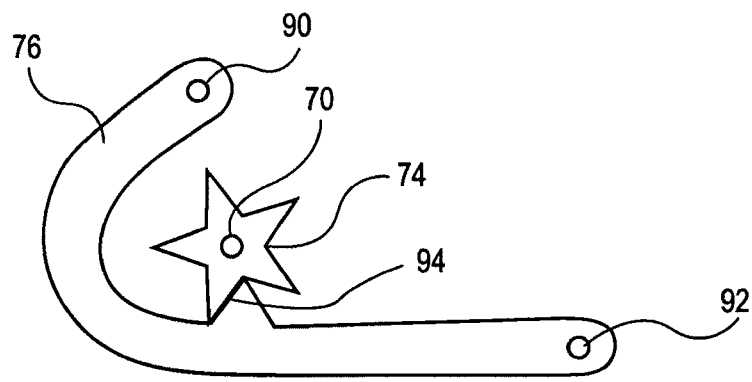
FIG. 5 is a simplified view of a release assembly in an engaged position according to another embodiment of the invention.

According to an embodiment of the invention, at a predetermined temperature, the link 78 is configured to soften, melt, or otherwise lose sufficient structural integrity to retain the drop arm 76. The predetermined temperature may be set according to a variety of factors. These factors may include, for example, expected normal ambient temperature, manufacture's recommendation, empirical data, and the like. To facilitate manual operation and/or testing of the door system 10, the link 78 may be attached to the drop arm 76 via a line 80 and the line 80 may be attached to a handle or switch 82. As shown in FIGS. 4 and 5, the switch 82 may be moved from a first to a second position to control the drop arm 76. In another example, the link 78 may pass through a hole in the bracket 32 to secure the drop arm 76 and a ring or handle may remain outside of a housing. In this manner, the ring provides a gripping surface to remove the link 78 and is readily available to test the door system 10.

According to another embodiment, the link 78 may include an electronic release device such as, for example, an electromagnetically coupled link, solenoid release device, or the like. In this embodiment, the link 78 may release the drop arm 76 in response to any suitable event such as, for example, a smoke alarm activation, security event, manual activation of a switch, and the like.

Figure 3:
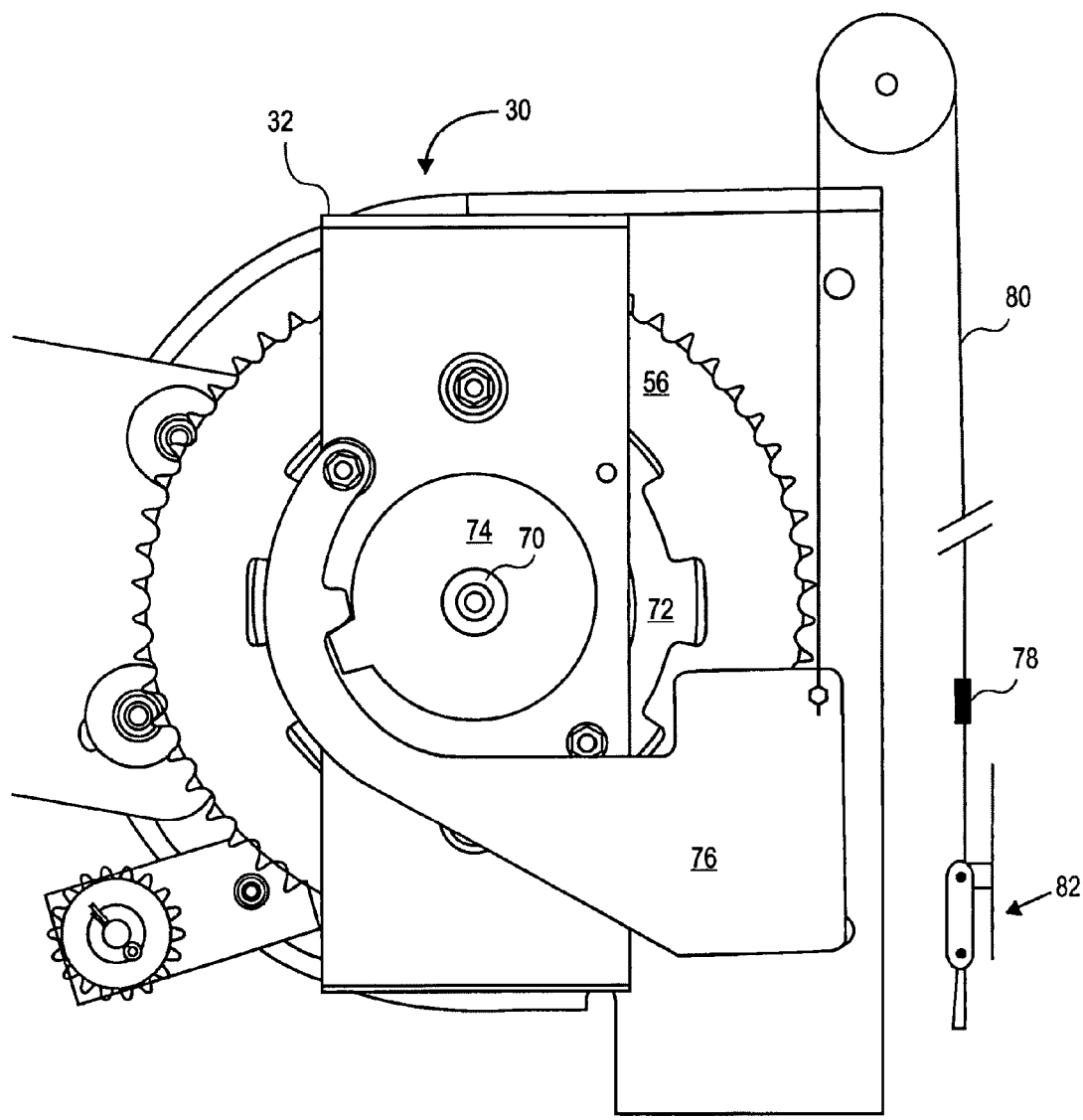
FIG. 3 is a simplified view of a release assembly in an engaged position according to an embodiment of the invention.

FIG. 3 is a simplified view of the drop arm 76 and plate 74 in the engaged position according to FIG. 2. As shown in FIG. 3, the drop arm 76 is secured to the link 78 via the line 80. In addition, the switch 82 is shown in a first configuration. In this first configuration, the line 80 is controlled to retain the drop arm 76 in the engaged position. When secured in the engaged position, the drop arm 76 and plate 74 lock together to prevent the plate 74 from turning. In turn, the governor shaft 70 is prevented from turning by the engaged plate 74. That is, the governor shaft 70 is rotationally fixed relative to the bracket 32 in response to the door release assembly 30 being in the engaged position.

FIG. 4 is a simplified view of the drop arm 76 and plate 74 in the disengaged position according to FIG. 2. As shown in FIG. 4, in response to disposing the switch 82 in a second position or compromising the structural integrity of the link 78, the drop arm 76 is configured to drop from the engaged position. As the drop arm 76 pivots away from the plate 74, the plate 74 is free to rotate. In this manner, the door release assembly may be controlled to release the door 12. Depending upon the bias of the door 12, releasing the release assembly may raise or lower the door 12. In a particular example, the door 12 may be biased to close and the door system 10 is configured to automatically close the door 12 in response to the ambient temperature exceeding the predetermined temperature. It is an advantage of the door system 10 that this automatic closure may proceed in a complete absence of electrical power. It is another advantage of the door system 10 that this automatic closure may proceed even if the chain drive 20 or motor 22 is disabled. It is a further advantage of the door system 10 that the system is easier and less expensive to maintain than an electronically controlled door closing system.

In another example, the link 78 may be electronically controlled to disassemble or otherwise release the line 80. In this example, the link 78 may be controlled to release the line 80 in response to the activation of a smoke alarm or security system activation.

In yet another example, the door 12 may be biased to fully or partially open. For example, in response to the drop arm 76 being released, a closed door 12 may be allowed to fully or partially open. In a particular example, if the door 12 provides an egress for a facility and the door 12 is closed, the door release assembly 30 may be automatically or manually controlled to release to door 12. In this manner, egress through the door 12 may be facilitated.

FIG. 5 is a simplified view of the drop arm 76 and plate 74 in the engaged position. As shown in FIG. 5, the drop arm 76 includes a pivot point 90 and a link point 92. The pivot point 90 may be pivotally connected to the bracket 32 or other such structural member via a shaft, bolt, rivet, or the like. The link point 92 is secured via the link 78 to the bracket 32 or other such structural member of the door system 10. When secured in the engaged position, the drop arm 76 and plate 74 lock together at an engagement interface 84 to prevent the plate 74 from turning. In turn, the governor shaft 70 is prevented from turning by the engaged plate 74. That is, the governor shaft 70 is rotationally fixed relative to the bracket 32 in response to the door release assembly 30 being in the engaged position.

As shown in FIGS. 2, 3, and 4, the link 78 may be secured to the link point 92 via a line 80. In another embodiment, the link 78 may be inserted through the link point 92 and into the bracket 32 or other such structural member. In this embodiment, by altering an angle of the engagement interface 94, the torque being applied to the plate 74, and a length relationship between the pivot point 90, engagement interface 94, and link point 92, an amount of sheer force exerted upon the link 78 may be adjusted. By configuring the structural integrity of the link 78 to fall below the sheer force at the predetermined temperature, the drop arm 76 may be controlled to disengage at the predetermined temperature.

Figure 6:
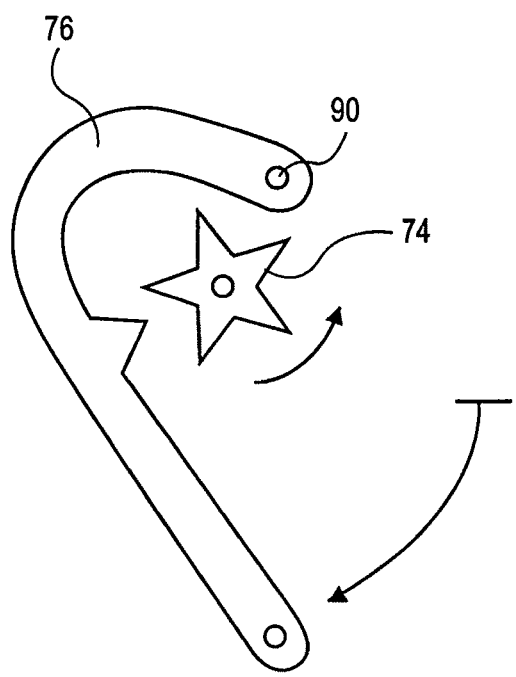
FIG. 6 is a simplified view of the release assembly in a disengaged position according to the embodiment of FIG. 5.

FIG. 6 is a simplified view of the drop arm 76 and plate 74 in the disengaged position according to FIG. 5. As shown in FIG. 6, in response to removal of the link 78 from the link point 92 or the structural integrity of the link 78 failing or falling below the sheer force exerted on the link 78, the drop arm 76 is configured to drop from the engaged position. As the drop arm 76 pivots away from the engagement interface 94 (shown in FIG. 2) the plate 74 is free to rotate.

As shown in FIG. 2, the free rotation of the plate 74 decouples the drive sprocket 56 from the drive assembly 28. That is, the rotational relationship between the drive sprocket 56 and the hub assembly 64 is decoupled. As such, the door 12 is free to close or open in accordance with the bias of the door 12. To control the rate at which the door 12 opens or closes, the rotation of the governor shaft 70 is controlled by the governor 72. In this regard, a hub of the governor 72 is secured to the governor shaft 70 and a housing of the governor 72 is secured to the bracket 32 or suitable structural member. The hub and housing of the governor 72 interact with one another via a viscous fluid or other such braking mechanism. The degree to which the governor 72 slows rotation of the governor shaft 70 may be determined based upon a variety of factors such as, for example, weight or closing bias of the door, fire door closing regulations, empirical data, and the like.

Figure 7:
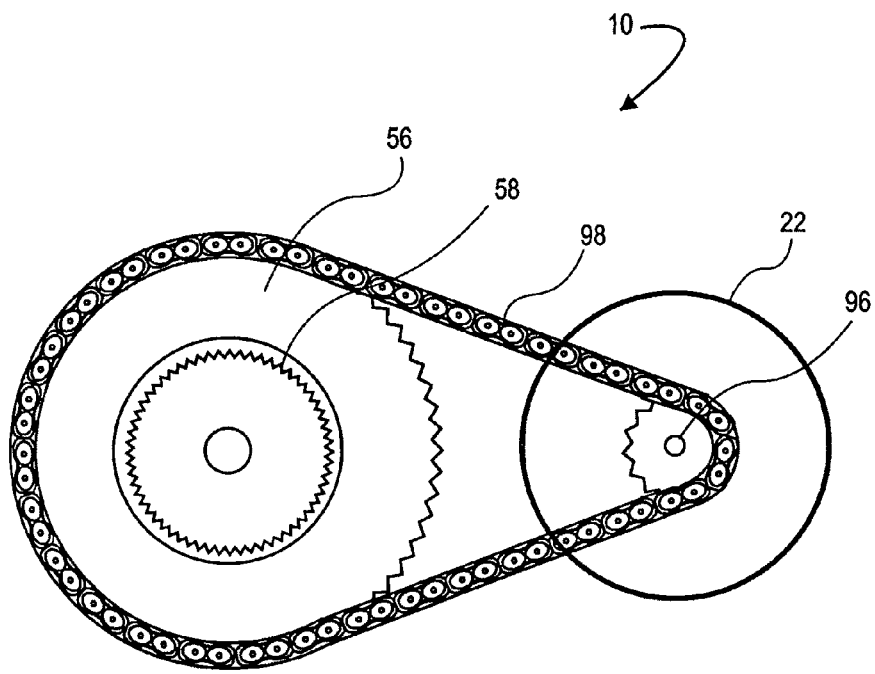
FIG. 7 is a detailed view of a horizontally oriented actuator engaging a drive sprocket according to another embodiment of the invention.

FIG. 7 is a detailed view of a horizontally oriented actuator engaging the drive sprocket 56 according to another embodiment of the invention. As shown in FIG. 7, the door system 10 includes a motor sprocket 96 that is rotated by the motor 22. In various embodiments, the motor sprocket 96 may directly engage the drive sprocket 56 or, as shown in FIG. 5, a chain 98 may engage both the motor sprocket 96 and the drive sprocket 56 and may be configured to transmit rotation of the motor sprocket 96 to the drive sprocket 56. In another example, the motor sprocket 96 and the drive sprocket 56 may be replaced with pulleys and the chain 98 may be replaced with a belt. These and other such transmission systems are within the purview of various embodiments of the invention.

Figure 8:
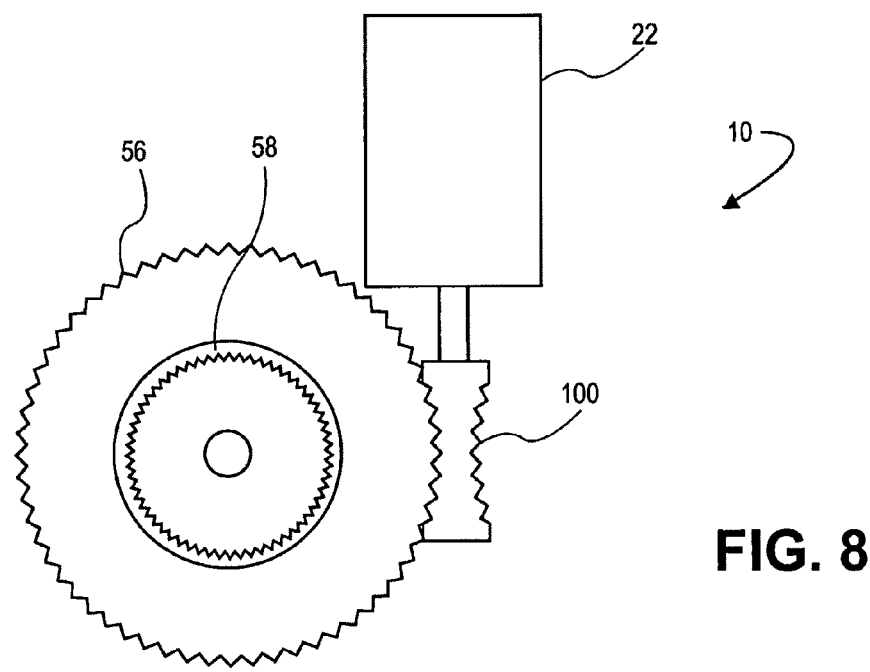
FIG. 8 is a detailed view of a vertically oriented actuator engaging a drive sprocket according to yet another embodiment of the invention.

FIG. 8 is a detailed view of a vertically oriented actuator engaging a drive sprocket 56 according to yet another embodiment of the invention. As shown in FIG. 6, the door system 10 includes a worm gear 100 that is rotated by the action of the motor 22. The worm gear 100 is configured to engage the drive sprocket 56 and urge the drive sprocket 56 to rotate in response to rotation of the worm gear 100. It is an advantage of such a worm drive that rotation is unidirectionally transmitted.

The many features and advantages of the invention are apparent from the detailed specification, and thus, it is intended by the appended claims to cover all such features and advantages of the invention which fall within the true spirit and scope of the invention. Further, since numerous modifications and variations will readily occur to those skilled in the art, it is not desired to limit the invention to the exact construction and operation illustrated and described, and accordingly, all suitable modifications and equivalents may be resorted to, falling within the scope of the invention.

What is claimed is:

1. A method of controlling operation of a door rollable onto a door shaft, the method comprising:
    rotationally fixing a sun gear to a governor of a release assembly;
    mating a plurality of planetary gears around the sun gear and within a ring gear affixed to a drive sprocket;
    rotating the drive sprocket to rotate the plurality of planetary gears around the sun gear to cause an axis of one of the plurality of planetary gears to revolve about an axis of the governor, the same axis as the central axis of the sun gear;
    rotating a hub assembly onto which the plurality of planetary gears are rotationally fixed, wherein the hub assembly, the planetary gear, the sun gear, and the governor are enclosed in a single assembly housing positioned and installed on one end of the door shaft; and
    rotating the door shaft affixed to the hub assembly to operate the door.

2. The method according to claim 1, further comprising:
    releasing the sun gear to allow the hub assembly to rotate relative to the drive sprocket; and
    rotating the door shaft in response to rotation of the hub assembly.

3. The method according to claim 2, further comprising:
    restraining rotation of the sun gear with the governor to limit rotation of the hub assembly, wherein the sun gear is connected to the governor via a governor shaft.

4. The method according to claim 1, further comprising:
    rotationally fixing the sun gear to a fusible link via the release assembly.

5. The method according to claim 1, further comprising the step of:
    rotationally fixing the sun gear with an electronic release configured to release the brake assembly in response to a signal.

6. The method according to claim 2, further comprising:
    biasing the door to close.

7. The method according to claim 2, further comprising:
    biasing the door to close using gravity acting on the door.

* * * * *